United States Patent [19]

Tomasek

[11] Patent Number: 4,841,213
[45] Date of Patent: Jun. 20, 1989

[54] CURRENT AND TORQUE FEEDBACK SYSTEM AND CIRCUITRY FOR SINE-WAVE CONTROLLED BRUSHLESS SERVO DRIVE SYSTEMS

[75] Inventor: Jaroslav Tomasek, Plymouth, Minn.

[73] Assignee: FMC Corporation, Chicago, Ill.

[21] Appl. No.: 176,536

[22] Filed: Apr. 1, 1988

[51] Int. Cl.$^4$ .............................................. G05B 1/06
[52] U.S. Cl. .................................... 318/661; 318/605
[58] Field of Search ...................... 318/605, 654, 661; 310/162

[56] References Cited

U.S. PATENT DOCUMENTS

| | | | |
|---|---|---|---|
| 4,151,452 | 4/1979 | Yonescu | 318/605 |
| 4,358,722 | 11/1982 | Iwakane et al. | 318/661 |
| 4,447,771 | 5/1984 | Whited | 318/254 X |
| 4,547,719 | 10/1985 | Sakamoto et al. | 318/661 X |

FOREIGN PATENT DOCUMENTS

88/02574  4/1988  World Int. Prop. O. .......... 318/605

OTHER PUBLICATIONS

D. S. Evans et al; "Digital-to-Synchro Conversion", Automation (G.B.) vol. 5, No. 8, pp. 23–26.

Primary Examiner—Bentsu Ro
Attorney, Agent, or Firm—Lloyd B. Guernsey; R. C. Kamp; R. B. Megley

[57] ABSTRACT

A current and torque feedback system for use with sine-wave controlled brushless servo motors each having a plurality of stator windings, a permanent magnet rotor and a rotor position sensor. Current sensors detect instantaneous values of electrical currents in each of the stator windings; and circuitry computes peak current values and electrical polarity of each current. Circuitry uses sensor signals from the rotor position sensor to divide the electrical revolution of the brushless motor into a number of regions equal to the number of phases of the brushless motor with each of the regions centered about the peak values of the sensed currents. The peak values of the currents and the current polarities are coupled to circuitry which generates an output signal having a value proportional to the peak values of the currents and having a polarity indicative of the direction of the torque generated by the brushless motor.

8 Claims, 4 Drawing Sheets

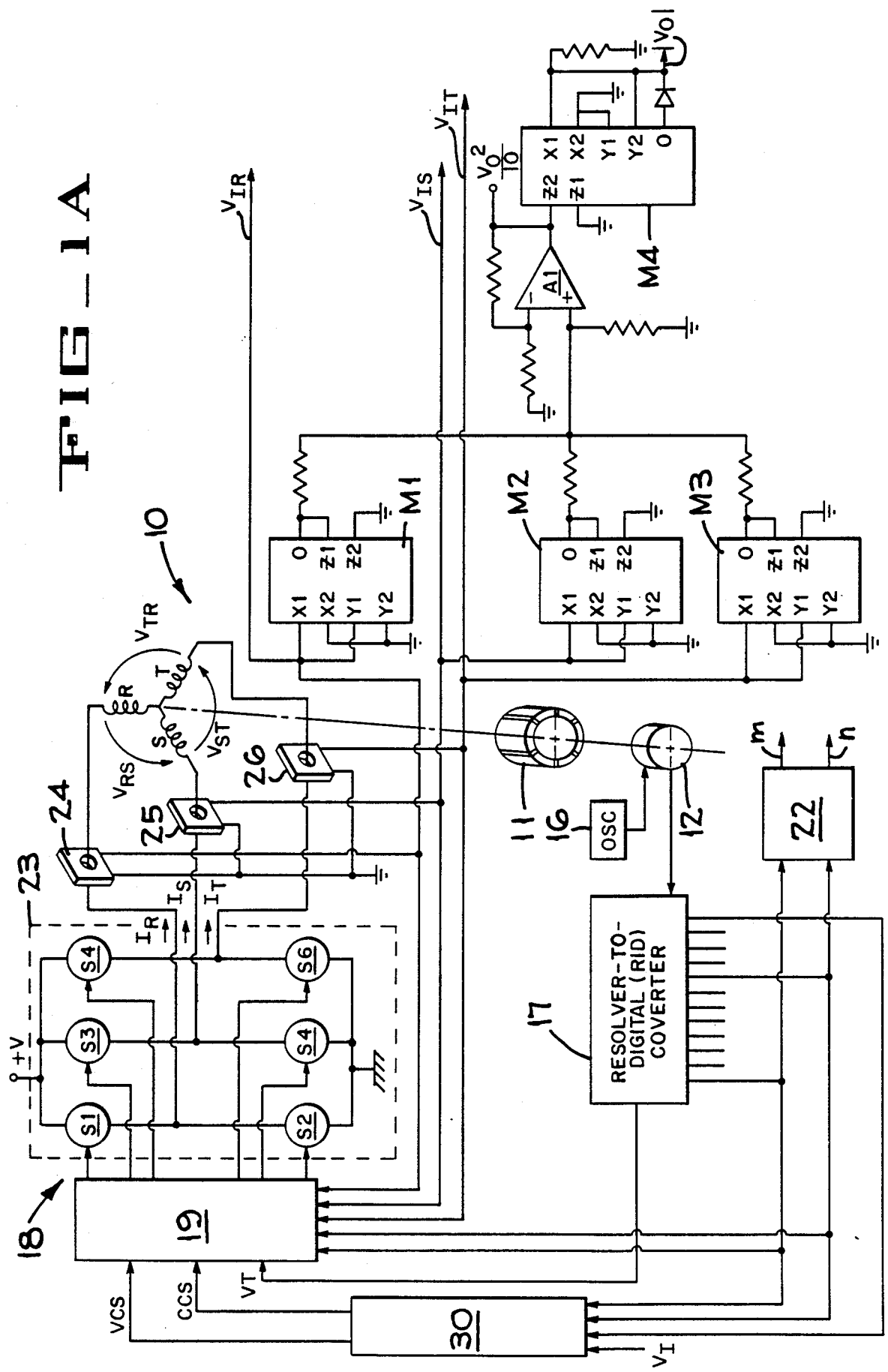
FIG_1A

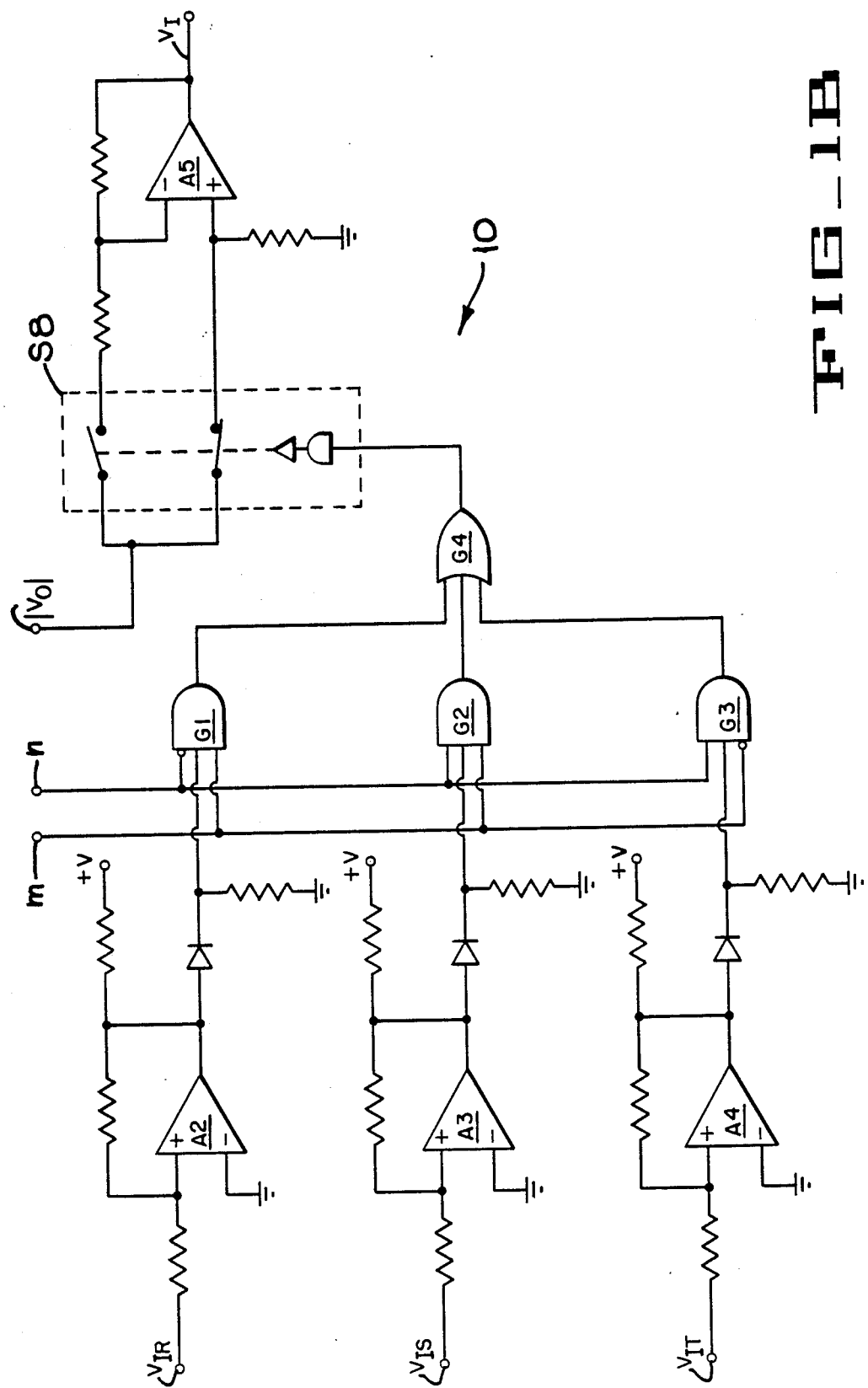
FIG_1B

FIG_2
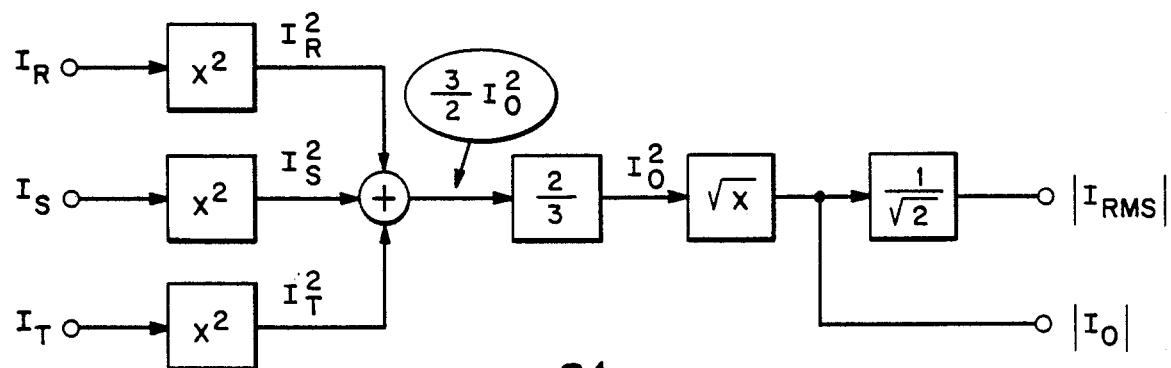
FIG_3
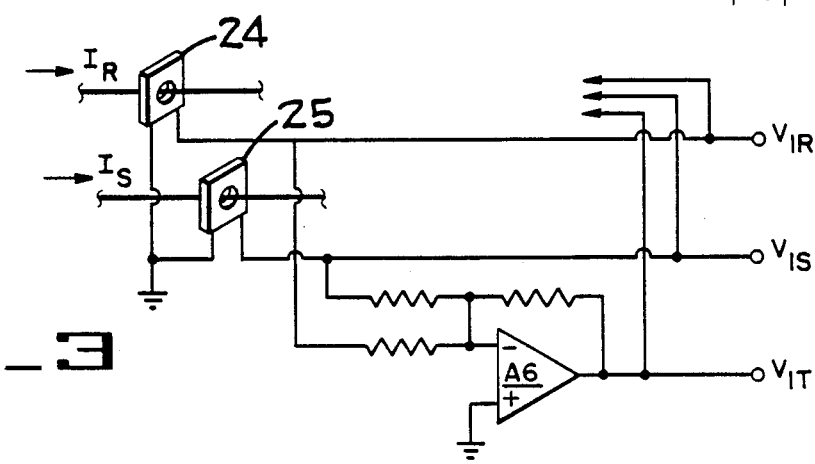
FIG_4
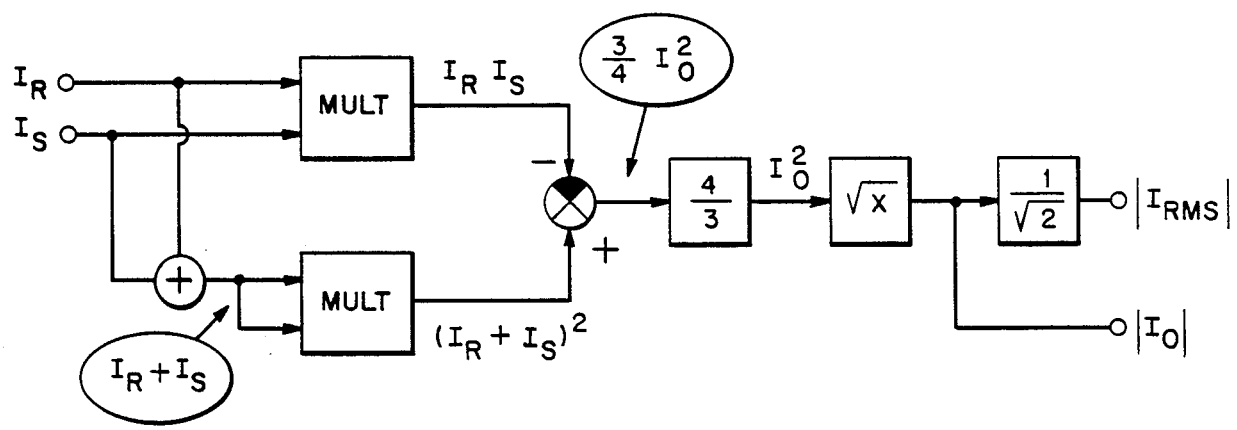

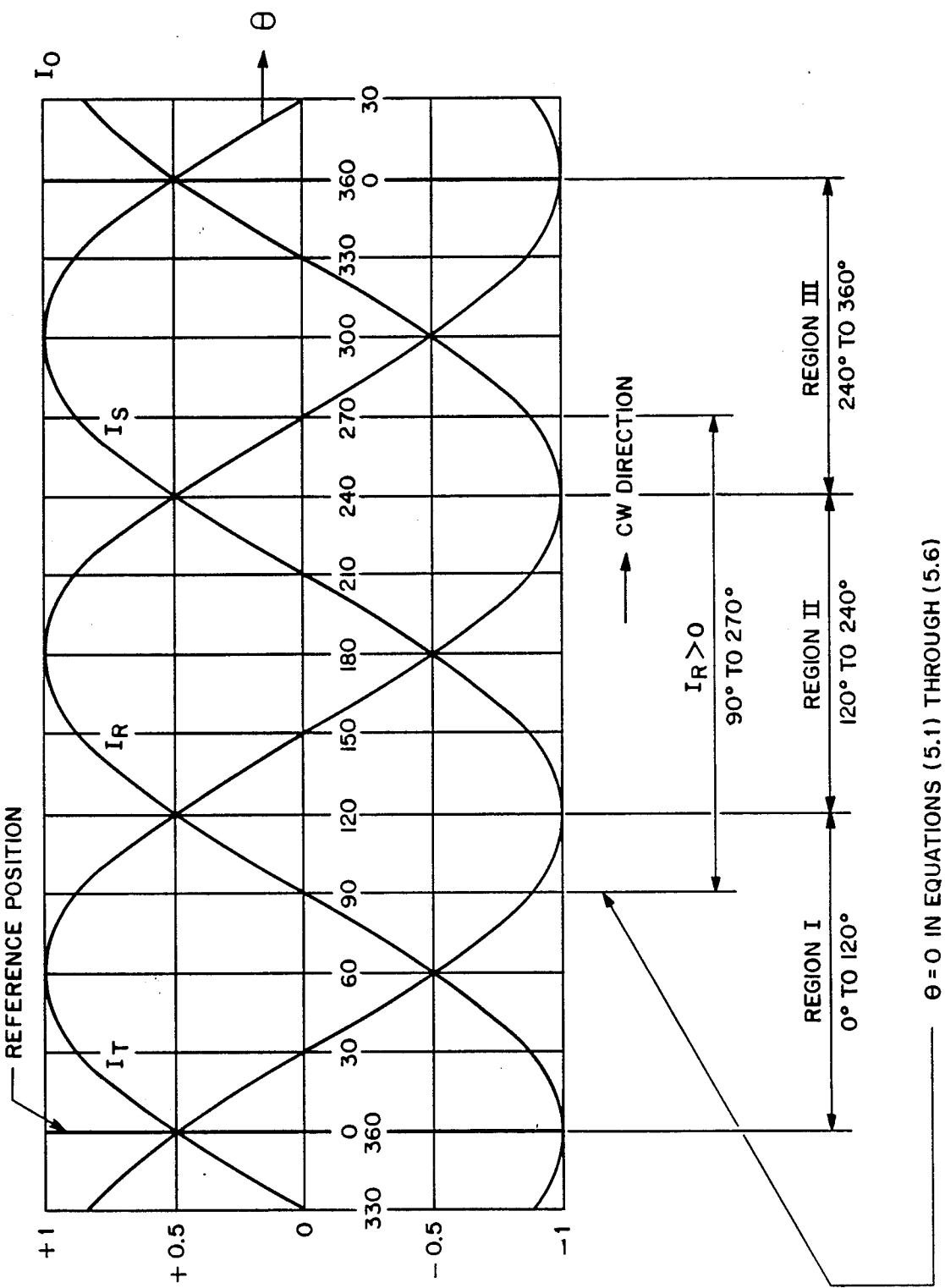

CURRENT AND TORQUE FEEDBACK SYSTEM AND CIRCUITRY FOR SINE-WAVE CONTROLLED BRUSHLESS SERVO DRIVE SYSTEMS

BACKGROUND OF THE INVENTION

The present invention pertains to brushless servo drive systems, and more particularly, to a current and torque feedback system and circuitry for use with sine-wave controlled brushless servo motors.

A brushless servo motor can be defined as a motor which includes a stator having a plurality of fixed windings; a rotor having permanent magnets attached to the rotor; and a means of sensing rotor position. A servo amplifier coupled to the stator windings and to the rotor sensor provides current to the stator windings to control rotation of the servo motor. The amount of torque developed by the servo motor is determined by the strength of the magnetic field produced by the rotor magnets, by the length of the wire of the windings in the magnetic field and by the amount of current in the windings. The servo amplifier controls the amount of current to the stator windings to control motor torque; and the servo amplifier also controls the speed of rotation of the motor.

SUMMARY OF THE INVENTION

The current and torque feedback system of the present invention discloses circuitry which provides accurate feedback information about servo motor currents and about the generated torque in brushless servo drive systems employing sinusoidal control. Sinusoidal servo motor phase curents which are functions of motor rotor position are generated by a servo amplifier. The absolute magnitude of the motor phase current is determined by the overall servo loop requirements for generating a given instantaneous torque. The phase currents in the stator windings are measured and compared with the current commands needed to provide he desired amount of motor torque. Any difference between the measured phase currents and the current commands is used to provide a correction signal to the servo amplifier causing the amplifier to change the value of the phase currents to correct the amount of motor torque. Motor speed is also sensed and compared with a desired motor speed. Any difference between sensed speed and desired speed causes the servo amplifier to provide a correction signal which corrects the motor speed.

BRIEF DESCRIPTION OF THE DRAWINGS

FIGS. 1A, 1B combine to provide a current and torque feedback circuitry for sine-wave controlled brushless servo motors.

FIG. 2 is a block diagram of a portion of FIG. 1 illustrating the mode of operation of that portion of the circuitry.

FIG. 3 is another embodiment of a portion of the circuitry of FIG. 1.

FIG. 4 is a block diagram of the circuitry of FIG. 3 illustrating the mode of operation of that embodiment of the present invention.

FIG. 5 illustrates the current waveforms in the stator windings of the brushless servo motor.

DESCRIPTION OF THE PREFERRED EMBODIMENT

FIGS. 1A and 1B disclose a brushless servo motor 10 having a plurality of stator windings R, S, T, a permanent magnet rotor 11 and an attached brushless resolver 12. The resolver 12 comprises a rotary transformer having a plurality of windings (not shown), a rotatable primary winding coupled to an oscillator 16 and a pair of stationary secondary windings coupled to a resolver-to-digital converter 17. Converter 17 provides a motor velocity signal $V_T$ to signal processing circuitry 18 of a servo amplifier 19. Converter 17 also provides an 8-bit position feedback signal to servo amplifier 19 and to a combination logic circuit 22. Signal processing circuitry 18 provides switching signals to a plurality of switches S1-S6 in a servo amplifier output stage 23. Switches S1-S6 provide a plurality of stator currents $I_R$, $I_S$, $I_T$ to motor stator windings R, S. T.

A plurality of current sensors 24-26 each provide an output voltae $V_{IR}$, $V_{IS}$, $V_{IT}$ proportional to the value of the corresponding currents $I_R$, $I_S$, $I_T$. A plurality of analog multipliers M1-M4 (FIG. 1A), operational amplifiers A1-A5, gates G1-G4 (FIG. 1B) and a solid-state switch S8 use the values of $V_{IR}$, $V_{IS}$, $V_{IT}$ to generate a D.C. voltage $V_I$ indicative of the instantaneous magnitude $[I_O]$ of the motor phase currents (peak of the waveform), as well as of the currents' phasing relationships which determine the magnitude and polarity of generated torque $[T_G]$ as follows:

$$I_O = |I_O| > \quad \text{by definition} \tag{1.1}$$

$$|T_G| = K_T I_O \tag{1.2}$$

where $K_T$ is the torque contant of the motor $$V_I = k_1 |I_O| \text{sign}(T_G) \tag{1.3}$$

where
sign $(T_G) = +1$ fo CW torque
sign $(T_G) = -1$ for CCW torque
(assigned arbitrarily)
so that $$V_I = k_1(|T_G|/K_T)\text{sign}(T_G) \tag{1.4}$$

$$V_I = k_2 |T_G| \text{sign}(T_G) = k_2 T_G \tag{1.5}$$

The $V_I$ voltage provides feedback information about the magnitude of generated torque, and about its polarity. The current and torque feedback is useful in all high-performance servo drive systems, and is especially needed in a torque-control mode of operation. The feedback signal $V_I$ (FIG. 1B) is coupled to a digital motion controller 30 (FIG. 1A) and compared with a current command signal (CCS) in signal processing circuitry 18. Any difference between values of $V_I$ and CCS is used to correct the values of currents $I_R$, $I_S$, $I_T$ so the desired amount and polarity of torque is accurately generated by servo motor 10.

If desired the servo drive system of the present invention can be operated in a velocity-control mode. In this mode digital motion controller 30 generates a velocity command signal which is compared with the motor velocity signal ($V_t$) in the signal processing circuitry 18 to control motor speed.

The torque generated by each motor phase winding is a product of current in the phase winding and the corresponding air gap flux density generated by the permanent magnet rotor.

If we designate the windings as R, S, T and specify $\theta$ to be the instantaneous rotor position in "electrical radians", the air gap flux densities can be written as:

$$B_R = B_0 \sin\theta \tag{5.1}$$

$$B_S = B_0 \sin\left(\theta + \frac{2\pi}{3}\right) \tag{5.2}$$

$$B_T = B_0 \sin\left(\theta + \frac{4\pi}{3}\right) \tag{5.3}$$

The motor currents are synthesized by the signal processing circuitry 18 and by output stage 23 (FIG. 1A) as $$I_R = I_0 \sin\theta \tag{5.4}$$

$$I_S = I_0 \sin\left(\theta + \frac{2\pi}{3}\right) \tag{5.5}$$

$$I_T = I_0 \sin\left(\theta + \frac{4\pi}{3}\right) \tag{5.6}$$

It can be shown that the torque generated by all three windings is independent of $\theta$, and given by $$T_G = (3/2) I_0 B_0 r 1 \tag{5.7}$$

where
$I_0$ is the (waveform) peak value of the phase current,
$B_0$ is the peak value of the air gap flux density,
r is the active turn radius,
1 is the active turn length.

The equation (5.7) contains only one input variable, $I_0$. The key to a proper current and torque feedback is to electronically compute $I_0$ and to assign polarity (+ or −) to the equation for detection of torque direction (CW or CCW).

Computation of $I_0$ has to be performed without a delay, i.e., from the measured instantaneous values of $I_R$, $I_S$ and $I_T$. A sample-and-hold approach cannot be used since the phase currents are functions of the rotor position, not time.

This invention is also based on an assumption that both
air gap flux densities, $B_X$, and
phase currents, $I_X$,
ar pure sinusoidal functions of the rotor position, $\theta$. In practice, these variables contain certain higher-order harmonic components which introduce errors in computations. However, with the current technology, the total (RMS) harmonic distortion of these variables can be kept below 2%.

The actual instantaneous values of the motor currents are represented by analog voltages generated by current sensors in the servo amplifier. Each of the voltage $VI_{IR}$, $V_{IS}$ and $V_{IT}$ from sensors 24–26 is equal to a constant $k_3$ times the current through the sensor.

$$V_{IR} = k_3 I_R, \quad V_{IS} = k_3 I_S, \quad V_{IT} = k_3 I_t$$

Motor stator currents:

$$I_R + I_S + I_T = 0 \quad \text{all the time.}$$

The servo motor current detection circuitry must also exclude the time, t, and rotor position $\theta$ completely from the computations; and extract torque polarity information from the measured currents and measured actual rotor position.

Starting with equations (5.1) through (5.6), the individual torques generated by each phase winding can be written as:

$$T_R = k_4 B_0 I_0 \sin^2\theta \tag{5.8}$$

$$T_S = k_4 B_0 I_0 \sin^2\left(\theta + \frac{2\pi}{3}\right) \tag{5.9}$$

$$T_T = k_4 B_0 I_0 \sin^2\left(\theta + \frac{4\pi}{3}\right) \tag{5.10}$$

where "$k_4$" is construction constant of a given motor. Torque, generated by all three windings, is:

$$T_G = T_R + T_S + T_T \tag{5.11}$$

Further, we can rearrange the torque equations:

$$T_R = k_4 \frac{B_0}{I_0} [I_0 \sin\theta]^2 \tag{5.12}$$

$$T_S = k_4 \frac{B_0}{I_0} \left[I_0 \sin\left(\theta + \frac{2\pi}{3}\right)\right]^2 \tag{5.13}$$

$$T_T = k_4 \frac{B_0}{I_0} \left[I_0 \sin\left(\theta + \frac{4\pi}{3}\right)\right]^2 \tag{5.14}$$

The above terms in brackets are the instantaneous phase currents $I_R$, $I_S$, $I_T$. By summing up their second powers, we can eliminate $\theta$, since:

$$\sin^2\theta + \sin^2\left(\theta + \frac{2\pi}{3}\right) + \sin^2\left(\theta + \frac{4\pi}{3}\right) = \frac{3}{2}$$

for any value of $\theta$. Thus, $$I_R^2 + I_S^2 + I_T^2 = (3/2) I_0^2 \tag{5.15}$$

and $$T_G = k_4 \frac{B_0}{I_0} \left(\frac{3}{2} I_0^2\right) = k_5 B_0 I_0 \tag{5.16}$$

The block diagram of a circuit to calculate electronically $I_O$ or $I_{RMS}$ is shown in FIG. 2. This circuit will calculate the absolute values of either the peak phase currents, or their RMS values. It also eliminates (at least in analog realization) the time from the computational process.

This circuit still does not indicate the polarity of generated torque, only its magnitude as:

$$|T_G| = k_5 B_0 |I_O| \quad \text{or} \tag{5.17}$$

$$|T_G| = \sqrt{2} k_5 B_0 |I_{RMS}| \tag{5.18}$$

One of the three analog multipliers (M1-M3) in FIG. 2 can be eliminated by employing:

$$I_R + I_S + I_T = 0 \tag{5.19}$$

An easy rearrangement of equation (5.15) yields (one of several possibilities):

$$(3/2)I_O^2 = I_R^2 + I_S^2 + I_T^2 = 2[(I_R + I_S)^2 - I_R I_S] \tag{5.20}$$

Current sensors 24-26 of FIG. 1A can be replaced by current sensors 24, 25 and operational amplifier A6 of FIG. 3. A block diagram which illustrates a circuit utilizing formula (5.20) is disclosed in FIG. 4.

The diagram in FIG. 5 represents the waveforms and phasing relationships of the motor currents $I_R$, $I_S$, $I_T$ for generation of a constant CW torque in a typical sinewave controlled brushless servo system. For generation of CCW torque, the polarities of all three currents would be reversed.

The REFERENCE POSITION at 0 °$_{el}$ has been selected arbitrarily as a guidance for system design, and for motor/resolver alignment. It is different from $\theta = 0$ °$_{el}$ position in equations (5.1) through (5.6) and has no effect on the calculations.

The simplest approach to torque polarity detection would be to look at the polarity of $I_R$ between 90 and 270 °$_{el}$:
a. if $I_R > 0$, the motor generates CW torque, and
b. if $I_R < 0$, the motor generates CCW torque.

However, this approach has a severe practical deficiency around 90 and 270 °$_{el}$ where $I_R$ crosses zero, and particularly at low torque (current) levels, because:

required hysteresis of the polarity detection comparator, drifts and offsets of $V_{IR}$, and PWM ripple riding on the current waveform will make polarity detection around 90 and 270 °$_{el}$ impossible, thus reversing the polarity of the final $I_O$ readout at random.

The present invention divides the motor electrical revolution into three regions as indicated in FIG. 5, and looks selectively at the polarities of all three phase currents:

a. If
  $I_T > 0$ in Region I, or
  $I_R > 0$ in Region II, or
  $I_S > 0$ in Region III,
  the motor generates CW torque.
b. If
  $I_T < 0$ in Region I, or
  $I_R < 0$ in Region II, or
  $I_S < 0$ in Region III,
  the motor generates CCW torque.

At the boundaries of these regions the currents $I_R$, $I_S$, $I_T$ have an instantaneous value of $\pm 0.5\, I_O$. This eliminates all uncertainties in polarity detection process but requires more complex circuitry.

EXAMPLE OF TORQUE POLARITY DETECTION CIRCUITRY

1. The polarity of each voltage $V_{IX}$, representing the motor currents $I_X$ is detected by a comparator, and $$\left.\begin{array}{l} r = 1 \text{ if } V_{IR} > 0 \\ r = 0 \text{ if } V_{IR} < 0 \\ s = 1 \text{ if } V_{IS} > 0 \\ s = 0 \text{ if } V_{IS} < 0 \\ t = 1 \text{ if } V_{IT} > 0 \\ t = 0 \text{ if } V_{IT} < 0 \end{array}\right\} \tag{5.21}$$

2. The three regions of rotor position (FIG. 5) are identified by two logic signals:

| Region | I | II | III |
|---|---|---|---|
| m | 0 | 1 | 1 |
| n | 1 | 0 | 1 |

The "m" and "n" logic signals can be easily generated by selecting and processing proper bits of the parallel output word from the resolver-to-digital converter in the servo amplifier, which generates an absolute position feedback from the servo motor. This is done by combination circuit 22 (FIG. 1A).

3. The polarity of generated torque is indicated by a single logic signal:

| sign ($T_G$) | +(CW) | −(CCW) |
|---|---|---|
| p | 1 | 0 |

4. All logic signals, as defined in this example, can be combined in the following TRUTH TABLE:

| $T_G$ Polarity | Rotor Position | | $I_X$ Polarity | | | $T_G$ Polarity Detection |
|---|---|---|---|---|---|---|
| | Region | m | n | r | s | t | p |
| (+) CW | I | 0 | 1 | X | X | 1 | 1 |
| | II | 1 | 0 | 1 | X | X | 1 |
| | III | 1 | 1 | X | 1 | X | 1 |
| (−) CCW | I | 0 | 1 | X | X | 0 | 0 |
| | II | 1 | 0 | 0 | X | X | 0 |
| | III | 1 | 1 | X | 0 | X | 0 |

X = do not use (disregard) the signal
Equation for "p" signal:

$$p = t\overline{m}n + r m\overline{n} + s m n \tag{5.22}$$

5. This signal is used to select a (+1) or (−1) gain in the output buffer circuits for the $V_I$ signal, generated by the circuitry in FIG. 1B.

The combined circuitry generates an output voltage $V_I$ as follows:

$$V_I = k_1 |I_O| \text{sign}(T_G) \tag{1.3}$$

or $$V_I = \sqrt{2} k_1 |I_{RMS}| \text{sign}(T_G) \tag{5.23}$$

where the "sign ($T_G$)" is indicated by the logic signal "p".

Combined with the torque constant, $K_T$, of the motor, we obtain:

$$i\, V_I = k_2\, T_G \tag{1.5}$$

i.e., a true torque feedback signal.

The circuitry of the present invention uses the sinusoidal motor phase currents to develop feedback signal to accurately control torque of a brushless servo motor. These same phase currents are used to sense motor speed. Any difference between sensed speed and desired speed causes a servo amplifier to provide correction of motor speed.

Although the best mode contemplated for carrying out the present invention has been herein shown and described, it will be apparent that modification and variation may be made without departing from what is regarded to be the subject matter of the invention.

What is claimed is:

1. A current and torque feedback system for use with a sine-wave controlled brushless servo motor having a plurality of stator windings, a permanent magnet rotor and a rotor position sensor for developing sensor signals which indicate the rotary position of said motor rotor, said motor being connected to a servo amplifier for synthesizing and delivering sinusoidal electrical currents to said stator windings, said system comprising:

current sensing means for sensing instantaneous values of curents in each of said stator windings;

means responsive to said current sensing means for computing peak values of said currents in said stator windings;

means responsive to said current sensing means for sensing simultaneously and independently the electrical polarity of the current in each of said stator windings;

means using said sensor signals for dividing the electrical revolution of said brushless motor into a number of regions equal to the number of phases of said brushless motor with each of said regions centered at a corresponding one of the positions of peak values of said currents; and means using said sensor signals, said peak values of said currents and said current polarities for generating an output signal having a value proportional to said peak values of said currents and having a polarity indicative of the direction of the torque generated by said brushless motor.

2. A current and torque feedback system as defined in claim 1 wherein said motor is a three-phase brushless motor, and wherein said current sensing means includes three current sensors for sensing currents in each of the three phases.

3. A current and torque feedback system as defined in claim 2 wherein said generating means includes a plurality of analog multipliers for squaring said instantaneous values of each of said currents, a circuit for summing said squared values, and an analog multiplier connected to compute a square root of said sum value.

4. A current and torque feedback system as defined in claim 2 wherein the magnitude of a generated motor torque is proportional to the magnitude of electrical currents in said stator windings; and wherein said generating means causes said output signal to have a value proportional to said generated torque and polarity determined by the direction of said generated torque.

5. A current and torque feedback system as defined in claim 1 wherein said generating means includes a plurality of analog multipliers for squaring said instantaneous values of each of said currents, a circuit for summing said squared values, and an analog multiplier connected to compute a square root of said sum value.

6. A current and torque feedback system as defined in claim 1 wherein said dividing means includes a resolver attached to said servo motor rotor for developing a rotary position signal, a resolver-to-digital converter coupled to said resolver to convert said rotary position signal to a digital feedback signal, and a combination logic circuit for processing said feedback signal.

7. A current and torque feedback system as defined in claim 1 wherein said motor is a three-phase brushless motor, and wherein said current sensing means includes a pair of current sensors for sensing current in two of the three phases and an analog circuit for electronic computation of the current in a third phase by using the sensed currents from the two current sensors.

8. A current and torque feedback system as defined in claim 1 wherein the magnitude of a generated motor torque is proportional to the magnitude of electrical currents in said stator windings; and wherein said generating means causes said output signal to have a value proportional to said generated torque and a polarity determined by the direction of said generated torque.

* * * * *